Figure 8:
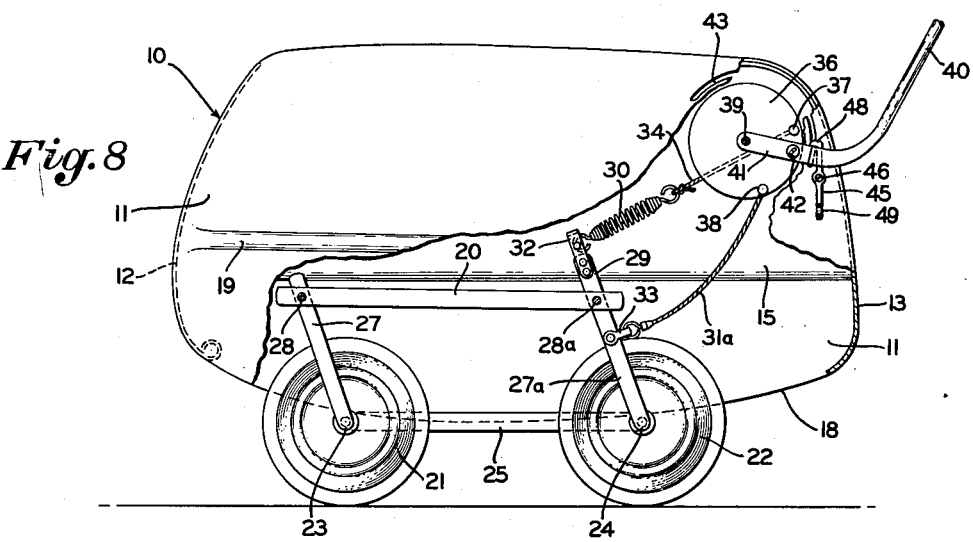

April 19, 1955     L. A. YARNELL     2,706,642
RETRACTABLE WHEEL SUPPORT FOR BABY CARRIAGES AND THE LIKE
Filed Nov. 3, 1953     3 Sheets-Sheet 1
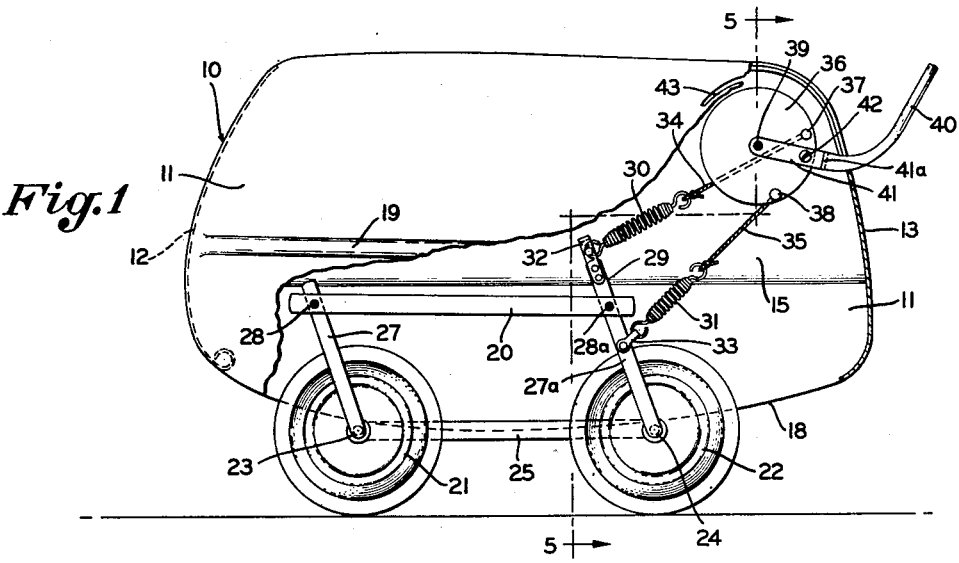
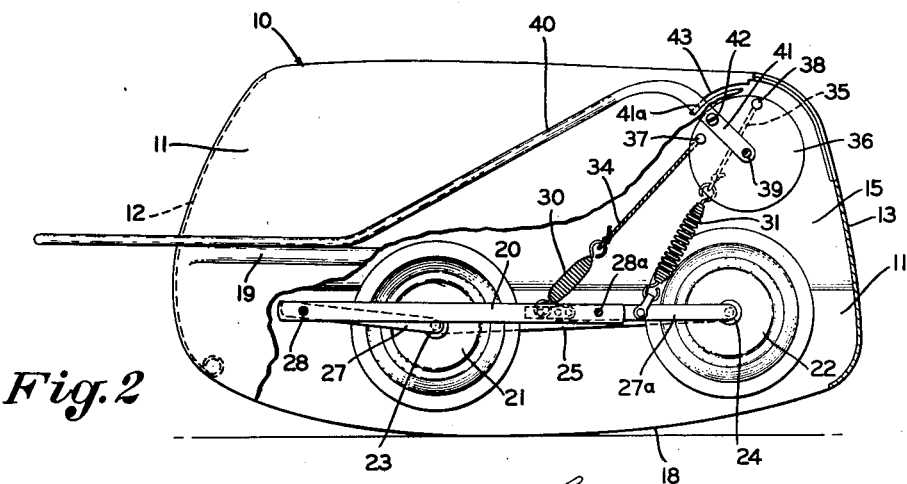
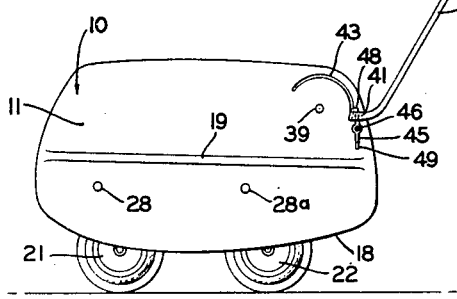
INVENTOR.
Lorace A. Yarnell
BY
Frease & Bishop
ATTORNEYS

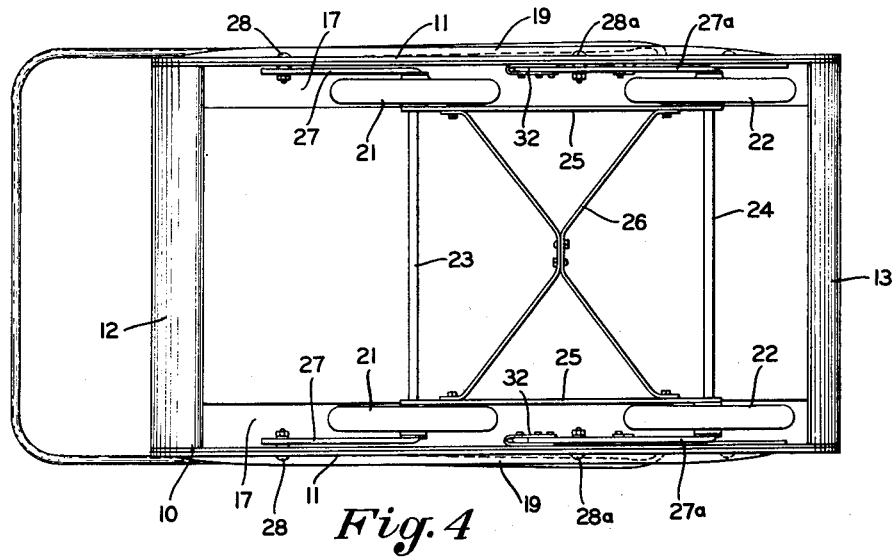
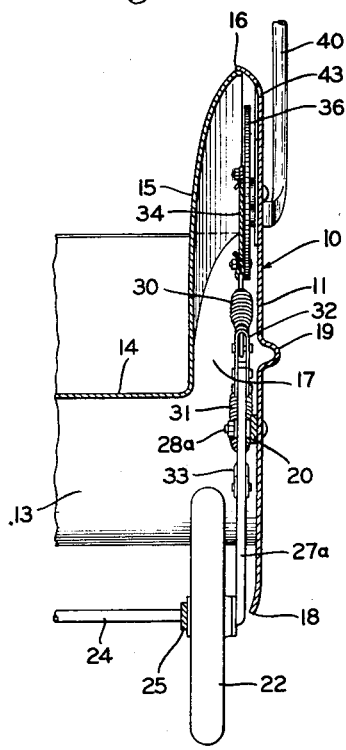
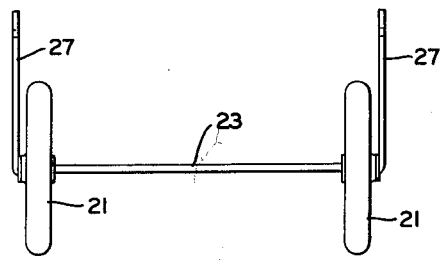
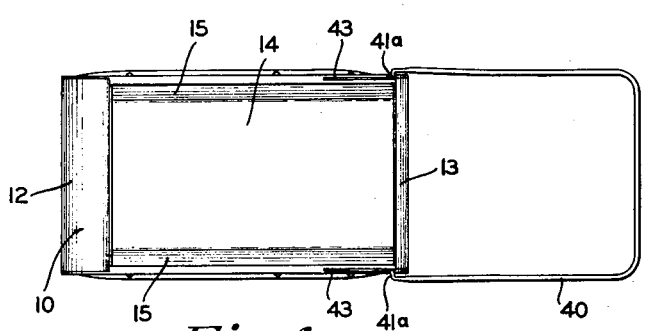

April 19, 1955 L. A. YARNELL 2,706,642
RETRACTABLE WHEEL SUPPORT FOR BABY CARRIAGES AND THE LIKE
Filed Nov. 3, 1953 3 Sheets-Sheet 3

INVENTOR.
Lorace A. Yarnell
BY Frease & Bishop
ATTORNEYS

United States Patent Office 2,706,642
Patented Apr. 19, 1955

2,706,642

RETRACTABLE WHEEL SUPPORT FOR BABY CARRIAGES AND THE LIKE

Lorace A. Yarnell, New Philadelphia, Ohio, assignor of one-half to Victor R. Marsh, Dover, Ohio Application November 3, 1953, Serial No. 389,993

12 Claims. (Cl. 280—41)

The invention relates to folding or retractable wheeled supports and more particularly to such a support especially adapted for baby carriages.

It is an object of the invention to provide a running gear adapted to be retracted and extended by flexible means which are moved over center from one position to the other.

Another object is to provide such a structure in which the flexible means provide a suitable spring suspension.

A further object is to provide a device of the character referred to in which the wheel axles are mounted in a frame carried by levers, flexible members being connected to the levers on opposite sides of their fulcrums and connected to a rotatable operating disc in such manner that as the disc is rotated from one position to the other the flexible members pass over center so as to hold the running gear in either position.

A still further object is to provide such a structure in which the operating disc is rotated by means of a lever which may form the handle for the baby carriage or the like, whereby folding of the handle over the baby carriage retracts the wheels, and extending of the handle to operative position extends the wheels.

Figure 9:
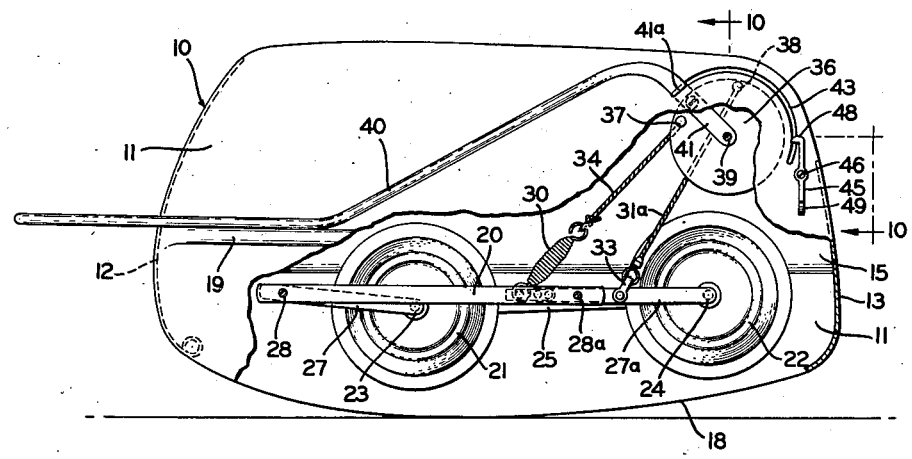
Figure 10:
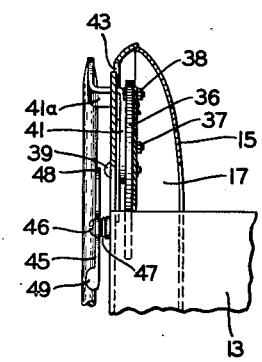

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings, in which;

Fig. 1 is a side elevation with parts broken away, of a baby carriage provided with the retractable support, showing the wheels in extended position;

Fig. 2 a similar view showing the wheels in retracted position;

Fig. 3 a side elevation on a smaller scale, showing the parts in the extended position;

Fig. 4 a bottom plan view of the baby carriage with the wheels in retracted position;

Fig. 5 an enlarged, fragmentary, vertical sectional view, taken as on the line 5—5, Fig. 1;

Fig. 6 a top plan view of the baby carriage;

Fig. 7 a detached elevation of one axle with the lever arms and wheels thereon;

Fig. 8 a view similar to Fig. 1, showing a slightly modified form of the invention;

Fig. 9 a view similar to Fig. 2, of the modified form; and,

Fig. 10 an enlarged, fragmentary vertical section, taken as on the line 10—10, Fig. 9.

Referring now more particularly to the preferred embodiment of the invention illustrated in Figs. 1 to 7 and 10 of the drawings, in which similar reference characters refer to similar parts throughout, the invention is shown as applied to a baby carriage having a body portion of any conventional design indicated generally at 10. If desired, any usual canopy or hood (not shown) may be provided.

This body portion may be made of any suitable material such as sheet metal, wood, plastic or the like, and comprises side walls 11, and front and back walls 12 and 13 respectively. A bottom wall 14 is located substantially mid-way between the upper and lower edges of the outer side walls 11, and connects at its side edges to the inner side walls 15 which extend upward and outward and are connected to the upper edges of the outer side walls as at 16, forming substantially narrow pockets 17 at opposite sides of the body.

The lower edges of the outer side walls 11 are preferably curved, as indicated at 18, to form rockers, whereby the baby carriage may be used as a cradle when the wheels are retracted as shown in Fig. 2.

A horizontal rib or bead 19 may be formed upon each outer side wall 11, at a point substantially mid-way between the top and bottom thereof, and may act as a stop for the handle as will be later described.

The running gear may be supported entirely upon the outer side walls 11, and for this purpose a flat substantially horizontally disposed bar 20 may be attached to the inner surfaces of each side wall 11 at a suitable distance above the lower edge thereof.

The front and back wheels 21 and 22 are mounted in pairs upon the axles 23 and 24 respectively. The axles are connected in spaced relation to a frame comprising the side members 25 and the X-shape brace 26.

This assembly of frame, axles and wheels is suspended from the bars 20 by levers 27 and 27a which may be formed integral with the axles 23 and 24. These levers are fulcrumed upon the studs or bolts 28 and 28a extending inwardly from the bars 20.

The levers 27a are extended a considerable distance above the fulcrums 28a, as indicated at 29, and coil springs 30 and 31 are connected to each lever 27a above and below the fulcrum respectively, as by clips 32 and 33.

The opposite ends of the springs 30 and 31 are connected by rods, cables or chains 34 and 35 to the operating disc 36, as indicated at 37 and 38. This disc is journalled upon the stud or bolt 39, extending inwardly from the corresponding outer side wall 11, and is adapted to be rotated about its pivot by means of the handle 40, the angularly disposed, flattened end portion 41 of which is rigidly attached to the disc 36, as by the screw or equivalent member 42 and the pivot stud 39, whereby it is disposed radially of the disc.

This flat, angular portion of the handle has the right angle offset portion 41a which extends through the arcuate slot 43 in the upper portion of the adjacent outer side wall 11 of the body. The handle thus enters the body at right angles so as to prevent pinching of the fingers or hands by the handle.

With this construction it will be seen that with the handle 40 in the operative position, as best shown in Figs. 1, 3 and 5 the points of connection 37 and 38 of the springs to the disc are located to the right of the pivot point 39, the spring 30 being under greater tension and preferably stronger than the spring 31 pulling the levers 27a, and through the frame 25—26, the levers 27, downward so as to extend the wheels 21 and 22 considerably below the body 10 so that the device assumes the form of a baby carriage and may be wheeled upon the ground or floor.

The points of connection 37 and 38, of the springs to the disc 36, having passed to the right of the pivot point 39, as viewed in Fig. 1, the springs 30 act in conjunction with the springs 31 to hold the handle 40 in the extended position.

In this position the springs 30 provide a spring suspension for the wheels so that the occupant of the baby carriage will ride comfortably and smoothly. For the purpose of positively holding the handle locked in the extended position with the wheels in lowered position, as shown in Fig. 1, a latch or snap bolt may be provided, as best shown in Figs. 3 and 10.

This latch may be as indicated at 45 in said figures, being pivoted upon the body of the carriage at 46, and spring loaded as indicated at 47 so as to normally urge the hooked end 48 to the position shown in Fig. 3, so as to engage over the offset portion of the handle in extended position as shown, and thus lock the handle in extended position. A knob 49 is provided upon the other end of the latch member 45 for releasing the same when it is desired to retract the wheels.

It should be understood that the specific type of latch illustrated is only by way of example, and that any conventional or well known type of latch means may be provided for locking the handle 40 and discs 36 against rotation when the handle is in the extended position.

When the handle 40 is folded down to the position shown in Fig. 2, the points of connection of the springs to the disc move over center as shown in said figure, the springs 31 being placed under greater tension than the springs 30, pulling the levers 27a, and through the frame 25—26, the levers 27, upward to substantially horizontal position, retracting the wheels above the lower edges of the side walls as shown, the upper portions of the wheels being received in the pockets 17 between the inner and outer side walls of the body.

In this position the ribs or beads 19 upon the side walls 11 form stops for the handle 40, limiting the downward movement thereof. The device may thus be used as a cradle or bassinet, or may be placed upon the seat of an automobile, providing a safe and convenient manner of carrying an infant in a car.

In Figs. 8 and 9 is shown a slightly modified embodiment of the invention in which the lower or rearmost springs 31 of Figs. 1 and 2 are replaced by flexible members such as chains or cables as indicated at 31a in said figures.

All other parts of the device are the same as shown in Figs. 1 to 7, and above described in detail, and the same reference numerals are used to designate like parts therein.

As shown in Fig. 8, with the handle 40 in the extended or operative position, the points of connection 37 and 38 of the spring 30 and chain or cable 31a respectively, have passed over center, to the right of the pivot point 39, the springs 30 being under tension and pulling the levers 27a, and through the frame 25, the levers 27, downward so as to extend the wheels 21 and 22 below the body. In this position the chain or cable 31a is slack, as shown in Fig. 8, and the latch 45 should be in locked position, as in Fig. 3, positively holding the handle in extended position. It should be understood that the form of the invention shown in Figs. 8 and 9 should include the latch means.

When the handle 40 is folded down to the position shown in Fig. 9, the points of connection of the spring 30 and chain or cable 31a move over center to the left of the pivot point 39, as shown in said figure, the chain or cable 31a being taut and pulling the levers 27a, and through the frame 25, the lever 27, upward to horizontal position, retracting the wheels 21 and 22 above the lower edges of the side walls of the body, while the spring 30 is slack as shown.

From the above it will be obvious that a simple, easily operated and efficient mechanism is provided for retracting or extending the wheels of a baby carriage, by movement of the handle from extended to folded position or vice versa, and it will be seen that in the extended position the wheels are provided with a spring suspension, so that the body of the baby carriage will ride smoothly.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A retractable wheel device comprising a body, spaced levers fulcrumed in the body and adapted to extend downwardly therebelow, one of said levers having its inner end extending above the fulcrum thereof, wheels journalled upon the outer ends of the levers, means connecting the levers together, a disc journalled in the body, springs connected to said disc and to said one lever on opposite sides of the fulcrum thereof, and means for rotating the disc to extend or retract the wheels.

2. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body.

3. A retractable wheel device comprising a body, spaced levers fulcrumed in the body and adapted to extend downwardly therebelow, one of said levers having its inner end extending above the fulcrum thereof, wheels journalled upon the outer ends of the levers, means connecting the levers together, a disc journalled in the body, springs connected to said disc and to said one lever on opposite sides of the fulcrum thereof, and means for rotating the disc to move the springs over center to extend or retract the wheels.

4. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to move the springs over center to extend the wheels as the handle is swung outward and to retract the wheels as the handle is swung over the body.

5. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, a frame connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body.

6. A retractable wheel baby carriage comprising a body, spaced levers fulcrumed in the body and adapted to extend downwardly therebelow, one of said levers having its inner end extending above the fulcrum thereof, axles integrally connected to the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body.

7. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body, and stop means limiting movement of the handle in each direction.

8. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body, there being slots in opposite sides of the body through which the handle is located.

9. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body, there being slots in opposite sides of the body through which the handle is located, said slots limiting outward movement of the handle.

10. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, springs connected to the disc and to said one lever on opposite sides of the fulcrum thereof, and a handle fixed to the disc for rotating the disc to extend the wheels as the handle is swung outward and to retract the wheels as the handle is swung over the body, there being slots in opposite sides of the body through which the handle is located, said slots limiting outward movement of the handle, and ribs upon the sides of the body limiting inward movement of the handle.

11. A retractable wheel device comprising a body, spaced levers fulcrumed in the body and adapted to extend downwardly therebelow, one of said levers having its inner end extending above the fulcrum thereof, wheels journalled upon the outer ends of the levers, means connecting the levers together, a disc journalled in the body, flexible members connected to said disc and to said one lever on opposite sides of the fulcrum thereof, one of said flexible members being a spring, and means for rotating the disc to extend or retract the wheels.

12. A retractable wheel baby carriage comprising a body, spaced levers fulcrumed in the body and adapted to extend downwardly therebelow, one of said levers having its inner end extending above the fulcrum thereof, axles carried at the outer ends of the levers, wheels upon said axles, means connecting the axles in spaced relation, a disc journalled in the body, flexible members connected to the disc and to said one lever on opposite sides of the fulcrum thereof, one of said flexible members being a spring, and a handle fixed to the disc for rotating the disc to extend the wheels as the handle is swung outward and to retract the wheels as the handle is swung over the body.

References Cited in the file of this patent

FOREIGN PATENTS

| | | |
|---|---|---|
| 281,310 | Switzerland | June 16, 1952 |
| 568,823 | France | Apr. 21, 1924 |